United States Patent
Schunk et al.

(10) Patent No.: US 9,475,037 B2
(45) Date of Patent: Oct. 25, 2016

(54) NICKEL HEXAALUMINATE-CONTAINING CATALYST FOR REFORMING HYDROCARBONS IN THE PRESENCE OF CARBON DIOXIDE

(71) Applicant: BASF SE, Ludwigshafen (DE)

(72) Inventors: Stephan Schunk, Heidelberg (DE); Ekkehard Schwab, Neustadt (DE); Andrian Milanov, Mannheim (DE); Guido Wasserschaff, Neckargemuend (DE); Thomas Roussiere, Mannheim (DE); Gerhard Cox; Bernd Hinrichsen, Stuttgart (DE); Ulrich Floerchinger, Dudenhofen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/771,888

(22) PCT Filed: Mar. 6, 2014

(86) PCT No.: PCT/EP2014/054362
§ 371 (c)(1),
(2) Date: Sep. 1, 2015

(87) PCT Pub. No.: WO2014/135642
PCT Pub. Date: Sep. 12, 2014

(65) Prior Publication Data
US 2016/0008791 A1    Jan. 14, 2016

(30) Foreign Application Priority Data

Mar. 7, 2013   (EP) .................................... 13158074
Nov. 26, 2013  (EP) .................................... 13194345

(51) Int. Cl.
*C01B 3/38*    (2006.01)
*C07C 1/02*    (2006.01)
(Continued)

(52) U.S. Cl.
CPC ................. *B01J 23/83* (2013.01); *B01J 21/04* (2013.01); *B01J 23/002* (2013.01); *B01J 23/02* (2013.01);
(Continued)

(58) Field of Classification Search
CPC .......... B01J 21/04; B01J 23/02; B01J 23/10; B01J 23/78; B01J 23/83; B01J 35/023; B01J 37/0236; B01J 37/04; B01J 37/08; C01B 3/40; C01B 2203/0227; C01B 2203/0238; C01B 2203/0805; C01B 2203/1058; C01B 2203/1082
USPC .......................... 502/335, 355, 439; 252/373
See application file for complete search history.

(56) References Cited

U.S. PATENT DOCUMENTS 5,830,822 A * 11/1998 Euzen .................... B01J 23/002
                                                    502/324
(Continued)

OTHER PUBLICATIONS

International Search Report issued Jul. 21, 2014 in PCT/EP2014/054362.
(Continued)

*Primary Examiner* — Cam N. Nguyen
(74) *Attorney, Agent, or Firm* — Oblon, McClelland, Maier & Neustadt, L.L.P

(57) ABSTRACT

The invention relates to a nickel hexaaluminate-comprising catalyst for reforming hydrocarbons, preferably methane, in the presence of carbon dioxide, which comprises hexaaluminate in a proportion in the range from 65 to 95% by weight, preferably from 70 to 90% by weight, and a crystalline, oxidic secondary phase selected from the group consisting of $LaAlO_3$, $SrAl_2O_4$ and $BaAl_2O_4$ in the range from 5 to 35% by weight, preferably from 10 to 30% by weight. The BET surface area of the catalyst is $\geq 5$ m$^2$/g, preferably $\geq 10$ m$^2$/g. The molar nickel content of the catalyst is $\leq 3$ mol %, preferably $\leq 2.5$ mol % and more preferably $\leq 2$ mol %. The interlayer cations are preferably Ba and/or Sr. The process for producing the catalyst comprises the steps: (i) production of a mixture of metal salts, preferably nitrate salts of Ni and also Sr and/or La, and a nanoparticulate aluminum source, (ii) molding and (iii) calcination. The catalyst of the invention is brought into contact with hydrocarbons, preferably methane, and $CO_2$ in a reforming process, preferably at a temperature of >800° C. The catalyst is also distinguished by structural and preferred properties of the nickel, namely that the nickel particles mostly have a tetragonal form and the particles have a size of $\leq 50$ nm, preferably $\leq 40$ nm and particularly preferably $\leq 30$ nm, and are present finely dispersed as grown-on hexaaluminate particles. The catalyst has only a very low tendency for carbonaceous deposits to be formed.

12 Claims, 6 Drawing Sheets

(51) Int. Cl.
| | |
|---|---|
| B01J 23/00 | (2006.01) |
| B01J 23/02 | (2006.01) |
| B01J 23/08 | (2006.01) |
| B01J 21/04 | (2006.01) |
| B01J 23/83 | (2006.01) |
| B01J 37/03 | (2006.01) |
| B01J 37/04 | (2006.01) |
| B01J 37/08 | (2006.01) |
| B01J 23/755 | (2006.01) |
| B01J 23/78 | (2006.01) |
| B01J 35/00 | (2006.01) |
| B01J 35/02 | (2006.01) |
| B01J 35/10 | (2006.01) |
| B01J 37/02 | (2006.01) |
| C01B 3/40 | (2006.01) |

(52) U.S. Cl.
CPC ............. *B01J 23/755* (2013.01); *B01J 23/78* (2013.01); *B01J 35/002* (2013.01); *B01J 35/006* (2013.01); *B01J 35/023* (2013.01); *B01J 35/1004* (2013.01); *B01J 37/0236* (2013.01); *B01J 37/031* (2013.01); *B01J 37/036* (2013.01); *B01J 37/04* (2013.01); *B01J 37/08* (2013.01); *B01J 37/088* (2013.01); *C01B 3/40* (2013.01); *C01B 2203/0227* (2013.01); *C01B 2203/0805* (2013.01); *C01B 2203/1058* (2013.01); *C01B 2203/1082* (2013.01)

(56) References Cited

U.S. PATENT DOCUMENTS

| | | | | |
|---|---|---|---|---|
| 7,736,536 | B2* | 6/2010 | Wang | C09K 11/7734 |
| | | | | 252/301.4 R |
| 7,888,278 | B2* | 2/2011 | Rapier | B01J 21/04 |
| | | | | 501/152 |
| 8,916,491 | B2 | 12/2014 | Querner et al. | |
| 2004/0242941 | A1* | 12/2004 | Green | C10G 2/332 |
| | | | | 568/910 |
| 2005/0232857 | A1 | 10/2005 | Lomax, Jr. et al. | |
| 2005/0265920 | A1* | 12/2005 | Ercan | B01J 21/04 |
| | | | | 423/651 |
| 2006/0213435 | A1* | 9/2006 | Friedrich | C23C 30/00 |
| | | | | 118/302 |
| 2007/0116639 | A1 | 5/2007 | Lomax, Jr. et al. | |
| 2007/0248764 | A1* | 10/2007 | Friedrich | C23C 4/02 |
| | | | | 427/419.2 |
| 2008/0038186 | A1 | 2/2008 | Lomax, Jr. et al. | |
| 2012/0273728 | A1* | 11/2012 | Abatzoglou | B01J 21/066 |
| | | | | 252/372 |
| 2013/0116116 | A1 | 5/2013 | Schwab et al. | |
| 2013/0210619 | A1* | 8/2013 | Schunk | C01B 3/40 |
| | | | | 502/303 |
| 2014/0001407 | A1 | 1/2014 | Milanov et al. | |
| 2014/0191449 | A1* | 7/2014 | Schunk | C01B 3/40 |
| | | | | 264/666 |
| 2015/0069300 | A1* | 3/2015 | Abatzoglou | B01J 21/066 |
| | | | | 252/373 |
| 2015/0336795 | A1 | 11/2015 | Kern et al. | |

OTHER PUBLICATIONS

Todd H. Gardner, et al., "Effect of nickel hexaaluminate mirror cation on structure-sensitive reactions during n-tetradecane partial oxidation" Applied Catalysis A: General, vol. 323, XP022021791, 2007, 8 pages.

Marina V. Bukhtiyarova, et al., "Steam reforming of methane over Ni-substituted Sr hexaaluminates" Catalysis for Sustainable Energy, XP055072020, vol. 1, 2012, pp. 11-21.

Wenling Chu, et al., "The partial oxidation of methane to syngas over the nickel-modified hexaaluminate catalysts $BaNi_yAl_{12-y}O_{19-\delta}$" Applied Catalysis A: General, vol. 235, No. 1-2, XP004379955, 2002, pp. 39-45.

Todd H. Gardner, et al., "Structural Characterization of Ni-Substituted Hexaaluminate Catalysts Using EXAFS, XANES, XPS, XRD, AND TPR" Journal of Physical Chemistry C, vol. 114, No. 17, XP055072006, 2010, pp. 7888-7894.

Wenling Chu, et al., "Selective oxidation of methane to syngas over NiO/barium hexaaluminate" Catalysis Letters, vol. 74, No. 3-4, 2001, pp. 139-144.

K. Ikkour, et al., "Activity of Ni Substituted Ca—La-hexaaluminate Catalyst in Dry Reforming of Methane" Catalysis Letters, vol. 132, 2009, pp. 213-217.

Junxia Wang, et al., "Catalytic Properties of Mg-Modified Ni-Based Hexaaluminate Catalysts for $CO_2$ Reforming of Methane to Synthesis Gas" React.Kinet.Catal.Lett., vol. 96, No. 1, 2009, pp. 65-73.

* cited by examiner

NICKEL HEXAALUMINATE-CONTAINING CATALYST FOR REFORMING HYDROCARBONS IN THE PRESENCE OF CARBON DIOXIDE

The invention relates to a nickel hexaaluminate-comprising catalyst for reforming hydrocarbons, preferably $CH_4$, in the presence of $CO_2$, which comprises nickel hexaaluminate with at least one element from the group consisting of La, Sr, Ba, preferably Sr and/or Ba, and a crystalline oxidic secondary phase, where the nickel content of the catalyst is ≤3 mol %, preferably ≤2.5 mol % and more preferably ≤2 mol %, based on the elements Al, Ni and interlayer elements. The proportion of nickel hexaaluminate is in the range 65-95% by weight, preferably in the range 70-90% by weight, and the main constituent of the secondary phase comprises at least one compound from the group consisting of $LaAlO_3$, $SrAl_2O_4$ and $BaAl_2O_4$. To produce the catalyst, an aluminum source, preferably an aluminum hydroxide, preferably made up of small primary particles, preferably having a primary particle size of less than or equal to 500 nm, is brought into contact with a metal salt solution, dried and calcined, preferably at a temperature of ≥900° C. The metal salt solution comprises a nickel salt and one or more metal salts comprising elements from the group consisting of La, Ba, Sr.

The reforming of methane and carbon dioxide is of great economic interest since synthesis gas can be produced by means of this process. Synthesis gas forms a raw material for the production of basic chemicals. In addition, the utilization of carbon dioxide as starting material in chemical syntheses is of significant importance in order to bind carbon dioxide, which is obtained as waste product in numerous processes, by a chemical route and thereby avoid emission into the atmosphere.

In accordance with its great economic importance, the reforming of hydrocarbons in the presence of carbon dioxide is subject matter of numerous publications. A brief overview of the main subjects of these publications is given below.

Chu et al. (W. Chu et al., Catalysis Letters, Vol. 74, No. 3-4 (2001) pp. 139-144) report the use of active compositions composed of barium hexaaluminate with nickel oxide precipitates (NiO/barium hexaaluminate) for the partial oxidation of methane. The synthesis of the barium hexaaluminates is based on precipitation from a solution of the nitrate salts of aluminum and barium by means of ammonium carbonate and calcinations at temperatures in the range from 900 to 1200° C. To precipitate the nickel, barium hexaaluminate is treated with nickel acetate solution, dried and calcined at 800° C. The amount of nickel precipitates is varied, with the smallest amount of nickel loading being 0.5% by weight and the highest amount of nickel loading being 20% by weight. The lower limit to the amount of nickel loading is thus about 0.5 mol % and the upper limit to the amount of nickel loading is 16.7 mol %, with the figure indicated in each case being based on the metallic elements Ni, Ba and Al.

Ikkour et al. (Catalysis Letters, vol. 132 (2009) pp. 213-217) report the activity of nickel-substituted calcium-lanthanum hexaaluminate catalysts in the dry reforming of methane. The studies are based on hexaaluminates having high nickel contents, with the molar nickel content being 7.69 mol %. The reported molar amount is here based on the metallic elements of the hexaaluminates, i.e. La, Ni and Al or Ca instead of La and also mixtures of Ca and La. The materials are synthesized via a solution of the nitrate salts which is admixed with citric acid and from which part of the water is evaporated so as to form a gel. The gel is dried at 100° C. and calcined for 2 hours at 500° C. and 8 hours at 1100° C. In the introductory part of the article, it is mentioned that the nickel hexaaluminates can be present both with lanthanum and also with alkaline earth elements from the group consisting of Ca, Ba, Sr. The reference is based on nickel hexaaluminates whose nickel content is 7 mol %, with the figure indicated being based on the metal atoms Ni, Al and the element of the intermediate plane. Reference is also made to lanthanum-nickel hexaaluminates ($LaNi_{0.3}Al_{11.7}O_{19-\delta}$) which have a low nickel content. Based on the metallic elements La, Ni and Al, this hexaaluminate has a nickel content of 2.14 mol % of nickel.

In summary, it can firstly be stated here that numerous publications which can be found in the prior art on the subject of nickel hexaaluminate-comprising materials relate to materials having a high nickel content, with the molar content of nickel (which is based on the molar amount of metallic elements or on all elements with the exception of oxygen) often being 7 mol %.

Those publications which relate to hexaaluminate-comprising materials having low nickel contents frequently have lanthanum as interlayer elements or interlayer cations. An example which may be mentioned here is the publication by Wang et al. (React. Kinet. Catal. Lett, vol. 96, No. 1 (2009) pp. 65-73) in which the nickel is replaced in various amounts by magnesium, with the nickel content in a sample being 1.54 mol %. The nickel content reported is based on the elements Al, Mg, La and Ni.

Apart from the above, reference may be made to a publication by Gardner et al (Todd H. Gardner et al., Applied Catalysis A: General 323 (2007) pp. 1-8, which relates to nickel-substituted hexaaluminate catalysts in which La, Sr and Ba are used as interlayer cations. The catalysts having the empirical formula $ANi_{0.4}Al_{11.6}O_{19-\delta}$ (A=La, Sr and Ba) are used for the partial oxidation of n-tetradecane which here represents a model compound of a middle distillate product. The study aims to develop catalysts which are suitable for the production of fuels for fuel cells. Based on the alkaline earth elements Sr or Ba (or La) and also Ni and Al, the nickel content of the samples is 3.08 mol %.

In combination with lanthanum, Todd H. Gardner in his thesis (entitled "Hexaaluminate Catalysts for the Partial Oxidation of Middle Distillate Fuels" (2007) Morgantown, W. Va., USA) has also reported hexaaluminate-comprising materials with $LaNi_{0.2}Al_{11.8}O_{19-\delta}$ and thus nickel-comprising hexaaluminates having low nickel contents. In the present case, the nickel content is 1.54 mol % of nickel based on the elements La, Ni, Al. The materials are obtained by precipitation from a solution of the nitrate salts, with ammonium carbonate being used as precipitation reagent.

Mention may also be made of a publication by Todd H. Gardner et al. (J. Phys. Chem. C 2010, 114 pp. 7888-7894) in which nickel-comprising or nickel-substituted hexaaluminates having barium as interlayer cation (i.e. $Ba_{0.75}Ni_yAl_{12-y}O_{19-\delta}$, where y assumes values of 0.2, 0.4, 0.6, 0.8 and 1.0) are examined. These materials are produced from a solution of the corresponding nitrate salts by precipitation by means of soluble carbonates. The precipitation products are dried at a temperature of 110° C. and calcined at a temperature of 1400° C., with the temperature being maintained at 1400° C. for 1 hour. The barium-nickel-comprising hexaaluminate samples produced in this way have BET surface areas in the range from 8 to 12 $m^2/g$.

It is an object of the invention to provide an active, carbonization-resistant, aging-stable and high-performance catalyst for reforming hydrocarbons and carbon dioxide and to improve the catalysts known in the prior art. In addition, the catalyst should be produced in a way which conserves resources.

The abovementioned objects and further objects which have not been mentioned are achieved by a catalyst being provided as described below:

Catalyst for reforming hydrocarbons and $CO_2$ which comprises oxidic support material comprising hexaaluminate in the form of β"-aluminate and/or magnetoplumbite and metallic nickel particles, wherein the metallic nickel particles in the catalyst mostly have a tetragonal form, are finely distributed over the surface of the oxidic support material as grown-on particles and the average particle size of the nickel particles is ≤50 nm, preferably ≤40 nm and particularly preferably ≤30 nm.

The catalyst preferably additionally has the following properties: the oxidic phase of the catalyst comprises 65-95% by weight, preferably 70-90% by weight, of hexaaluminate and 5-35% by weight, preferably 10-30% by weight, of crystalline oxidic secondary phase, the hexaaluminate-comprising phase comprises at least one interlayer cation from the group consisting of Ba, Sr and La with a molar interlayer cation to aluminum ratio in the range 1:6-11, preferably 1:7-10 and particularly preferably 1:8-10, the crystalline oxidic secondary phase comprises at least $LaAlO_3$, $SrAl_2O_4$ and/or $BaAl_2O_4$, the BET surface area of the catalyst is ≥5 $m^2/g$, preferably ≥10 $m^2/g$.

As regards the nickel content of the catalyst of the invention, the following should preferably be adhered to here: the nickel content of the catalyst is ≤3 mol %, preferably ≤2.5 mol % and more preferably ≤2 mol %, and the predominant part of the nickel particles is present on the surface of the hexaaluminate phase. (That is to say more than 50%, preferably more than 70% and particularly preferably more than 80%, with nickel in the hexaaluminate lattice not being taken into account here.)

In a preferred embodiment, the catalyst of the invention is a catalyst for reforming hydrocarbons and $CO_2$ which comprises at least 65-95% by weight, preferably 70-90% by weight, of nickel-barium hexaaluminate, where the hexaaluminate in the catalyst is present in the form of β"-aluminate having a [114] reflection at 35.72 2θ[°] and the catalyst comprises 5-35% by weight, preferably 10-30% by weight, of crystalline oxidic secondary phase, the nickel content of the catalyst is ≤3 mol %, preferably ≤2.5 mol % and more preferably ≤2 mol %, and the molar Ba to Al ratio of the catalyst is in the range 1:6-11, preferably 1:7-10 and particularly preferably 1:8-10, the crystalline oxidic secondary phase comprises at least $BaAl_2O_4$, the BET surface area of the catalyst is ≥5 $m^2/g$, preferably ≥10 $m^2/g$.

In a preferred embodiment, the invention provides a catalyst for reforming hydrocarbons and $CO_2$ which comprises at least 65-95% by weight, preferably 70-90% by weight, of nickel-strontium hexaaluminate in the form of magnetoplumbite and 5-35% by weight, preferably 10-30% by weight, of crystalline oxidic secondary phase, where the nickel content of the catalyst is ≤3 mol %, preferably ≤2.5 mol % and more preferably ≤2 mol %, and the molar Sr to Al ratio of the catalyst is in the range 1:6-11, preferably 1:7-10 and particularly preferably 1:8-10, the crystalline oxidic secondary phase comprises at least $SrAl_2O_4$, the BET surface area of the catalyst is ≥5 $m^2/g$, preferably ≥10 $m^2/g$.

An aspect of the invention also relates to a catalyst for reforming hydrocarbons and $CO_2$ which comprises at least 65-95% by weight, preferably 70-90% by weight, of nickel hexaaluminate and 5-35% by weight, preferably 10-30% by weight, of crystalline oxidic secondary phase, where the catalyst can be produced using a nanoparticulate aluminum oxide hydroxide source for the synthesis and the nickel content of the catalyst is ≤3 mol %, preferably ≤2.5 mol % and more preferably ≤2 mol %, the nickel hexaaluminate-comprising phase comprises at least one interlayer cation from the group consisting of Ba, Sr and La with a molar interlayer cation to aluminum ratio in the range 1:6-11, preferably 1:7-10 and particularly preferably 1:8-10, the crystalline oxidic secondary phase comprises at least $LaAlO_3$, $SrAl_2O_4$ and $BaAl_2O_4$, the BET surface area of the catalyst is ≥5 $m^2/g$, preferably ≥10 $m^2/g$. The molar nickel content reported is based on the cation-forming elements comprised in the catalyst, i.e. Al, Ni and interlayer elements. Thus, the presence of oxygen is not taken into account. Within the context of the present disclosure, it should be ensured, when defining the range of the interlayer cation to aluminum molar ratios, that the molar amount of interlayer cation should also include the respective molar amount of nickel.

The invention preferably provides a catalyst for reforming hydrocarbons and $CO_2$ which comprises at least 65-95% by weight, preferably 70-90% by weight, of nickel hexaaluminate in the form of β"-aluminate having a [114] reflection at 35.72 2θ [°] and/or magnetoplumbite and 5-35% by weight, preferably 10-30% by weight, of crystalline oxidic secondary phase, where the catalyst can be produced using a nanoparticulate aluminum oxide hydroxide source for the synthesis and the nickel content of the catalyst is ≤3 mol %, preferably ≤2.5 mol % and more preferably ≤2 mol %, the nickel hexaaluminate-comprising phase has at least one interlayer cation from the group consisting of Ba and/or Sr and the catalyst has a molar interlayer cation to aluminum ratio in the range 1:6-11, preferably in the range 1:7-10 and particularly preferably 1:8-10, the crystalline oxidic secondary phase comprises at least $SrAl_2O_4$ and/or $BaAl_2O_4$, the BET surface area of the catalyst is ≥5 $m^2/g$, preferably ≥10 $m^2/g$.

In a preferred embodiment, the X-ray diffraction pattern of the catalyst displays at most small amounts of γ- and/or, δ-, and/or, θ-, and/or α-aluminum oxide, where the amount of γ-aluminum oxide is less than 10% by weight, preferably less than 5% by weight and particularly preferably less than 2% by weight.

The invention also provides a process for producing the catalyst of the invention for reforming hydrocarbons and $CO_2$ which comprises at least 65-95% by weight, preferably 70-90% by weight, of nickel hexaaluminate-comprising main phase and 5-35% by weight, preferably 10-30% by weight, of crystalline oxidic secondary phase, where the production process comprises the following steps:

(i) contacting of a nanoparticulate aluminum oxide hydroxide source with metal salt comprising an element from the group consisting of La, Sr and Ba and also a nickel salt, where the nickel content is ≤3 mol %, preferably ≤2.5 mol % and more preferably ≤2 mol %, and the molar ratio of interlayer cation to aluminum is in the range 1:6-11, preferably 1:7-10 and in particularly preferably 1:8-10,
(ii) intimate mixing of the starting components,
(iii) at least drying, decomposition of the salts and/or molding of the mixture,
(iv) calcination at a temperature of ≥900° C. and also a reduction step.

For the purposes of the present disclosure, the term catalyst refers both to the oxidic hexaaluminate materials and to partially reduced active compositions in which part of the active metal remains in oxidic form in the hexaaluminate lattice. In addition, the term catalyst also refers to active compositions in which the active metal is virtually entirely present as metal. When the reduction of the precursor catalyst is carried out in a tube reactor, it has to be ensured that the degree of reduction is such that gradient formation can occur. Gradient formation depends very substantially on the reactor temperature and the temperature profile along the reactor axis. Characteristically, the degree of reduction increases with increasing temperature and is greater in the center of the reactor than in the peripheral region since in numerous reactors the temperature at the center of the reactor is higher than in the peripheral region. In view of this background, the terminology indicated here should be interpreted as allowing the catalyst to comprise all degrees of reduction which occur and also reduced/passivated active compositions. However, for the purposes of the disclosure, it is more convenient to speak of the precursor catalyst, and this term is therefore also used.

Suitable metal salt sources for producing the catalyst are, in particular, those which dissolve readily in aqueous solutions. Particular preference is given to nitrates, acetates, chlorides, with very particular preference being given to nitrates. It is also possible to use complexing agents; examples of suitable complexing agents are, inter alia, EDTA, amines, ammoniacal aqueous solutions, tartaric acid or citric acid. It is likewise possible to use nonaqueous organic solvents for carrying out the impregnation; examples of these are alcohols, ethers or ketones. When using such organic solvents, it is possible to use organic complexes of the metals, e.g. acetylacetonates, or metal-organic compounds.

The invention likewise encompasses the use of such promoters. One or more promoters can be added either directly in the impregnation of the nanoparticulate aluminum source or only after drying of the material, as an alternative only after calcination or molding. The promoters can be present in oxidic or metallic form, they can be incorporated in the hexaaluminate phase or one of the secondary phases. Such promoters are typically added in low concentrations; based on the active metal nickel, preferably in the range Ni/Me=2/1 to 1000/1, particularly preferably in the range Ni/Me=3/1 to 500/1, very particularly preferably in the range Ni/Me=4/1 to 100/1. Promoters according to the invention can be, inter alia: cobalt, iron, copper, silver, gold, platinum, palladium, rhodium, iridium, manganese, zirconium, titanium, cerium, praseodymium. Particular preference is given to platinum, iridium, cobalt and cerium. Very particular preference is given to iridium and cerium. The use of more than one promoter is likewise encompassed by the invention. Promoters can improve both the activity of the catalyst and its carbonization resistance. Promoters can be present in metallic or oxidic form after reduction, activation and/or reaction conditions.

As regards incompletely reduced catalysts which, as mentioned above, are within the scope of the invention, the following may be said: the nickel bound in the hexaaluminate lattice can sometimes only be incompletely reduced by reduction, activation and/or under reaction conditions and thus be removed only partly from the hexaaluminate lattice. The catalysts which are present in the partially reduced state have a lower content of active metal present in metallic form. The active metal present in metallic form is present in exposed form on the surface. However, oxidic nickel remaining within the hexaaluminate lattice can contribute to the structural stability of the lattice and thereby improve the carbonization resistance of the catalyst by means of an inherent redox activity. The use of catalysts which are deliberately reduced to a certain degree is likewise encompassed by the invention. The use of structured beds in which catalysts having different degrees of reduction are used in zones is likewise encompassed by the invention. Particular preference is given to embodiments in which the degree of reduction of the catalyst increases from the reactor inlet in the direction of the reactor outlet. Embodiments in which the degree of reduction of the catalyst is matched to the temperature profile and gas composition in the reactor are likewise encompassed.

An important aspect of the invention also relates to the presence of hexaaluminate-comprising catalysts having low nickel contents of ≤3 mol %, preferably ≤2.5 mol % and more preferably ≤2 mol %, and particular secondary phases. The nickel-comprising starting component preferably has to be added to the synthesis mixture directly in the production of the catalyst of the invention. Subsequent application of nickel to a hexaaluminate or to a hexaaluminate-comprising compound thus does not lead to the catalyst according to the invention.

With regard to the catalyst of the invention and the production process of the invention, no significant amount of nickel-comprising secondary phases are identified by means of X-ray studies. It can therefore be assumed that the catalyst of the invention comprises only insignificant amounts of nickel-comprising secondary phases.

It can be assumed that the nickel species are firstly predominantly incorporated into the framework structure of the hexaaluminate phase during the synthesis of the catalyst. Under the specific process conditions (by activation treatment or reduction step and reforming process), finely divided nickel species are formed on the outer surface of the hexaaluminate particles which are dissolved out from the framework. The catalyst which is obtained directly after calcination but which has not yet been treated by means of reduction step, activation step or process gas thus represents a precursor of the catalyst of the invention. It can be assumed that it is here also an important aspect of the invention that the nickel is virtually completely taken up in the hexaaluminate structure.

The synthesis of the catalyst of the invention is preferably also based on the use of a nanoparticulate aluminum oxide source as starting component. A synergistic effect results form the combination of the catalyst of the invention in respect of finely divided nickel particles usually having a tetragonal form, which are formed during the reduction, and the use of a preferred aluminum oxide source in the synthesis of the catalyst.

A structural feature of the catalyst, which relates to the presence of very finely divided nickel particles, can be detected by means of transmission electron microscopy.

In contrast to catalysts according to the invention having the grown-on finely divided particles having mostly tetragonal form, the catalysts of the prior art have a larger number of more or less spherical (i.e. ball-like) particles whose average size is in the range from about 60 to 200 nm. The ball-like particles having such large diameters in the range from 60 to 200 nm are extremely undesirable since it has been found that catalyst samples which have a relatively high density of such particles do not have the desired catalytic properties like the catalysts of the invention. In this context, it may also be pointed out that a semiquantitative TEM analysis of the surfaces of the hexaaluminate particles was carried out. The surfaces of the hexaaluminate particles examined by means of TEM characteristically have, in plan view, an area of about 450 nm×650 nm, which corresponds to a surface area of about 0.3 µm² (i.e. 0.45×0.65 µm²). The catalysts of the prior art displayed from about 20 to 30 ball-like particles per µm² of surface section. In the case of the catalyst of the invention, the number of ball-like particles per µm² of surface section was ≤10, preferably ≤5. The formation of ball-like, relatively large particles can be greatly minimized in the case of the catalysts of the invention but also cannot be completely ruled out.

In this context, it may also be pointed out that both the grown-on finely divided particles and the somewhat larger spherical particles are made up of nickel or nickel oxide and nickel, which does not come under the term oxidic crystalline secondary phase which for the purposes of the invention relates mainly to the aluminum oxide-comprising secondary phases comprising a further element from the group consisting of La, Sr, Ba, or preferably from the group consisting of Sr and Ba.

The low-nickel catalysts of the invention can be catalysts having La, Sr and Ba as interlayer cation. However, the data obtained in the catalytic reforming studies indicated that the interlayer cations Sr and/or Ba have somewhat better catalytic properties than La. In addition, Sr is somewhat more preferred than Ba as interlayer cation since the catalytic data achieved using strontium as interlayer cation are slightly better than the catalytic data based on barium-comprising catalysts. Strontium has further advantages related to the availability and sustainability of strontium-containing starting components.

The scope of the invention also includes any type of mixtures of the hexaalmuninate-comprising catalysts of the invention which have two or all three interlayer cations from the group consisting of La, Ba, Sr. Mixtures can be physical blends of catalysts which differ in respect of the interlayer cation or the mixtures can be obtained during the synthesis by addition of at least two starting components comprising species from the group consisting of La, Ba, Sr.

A modification of the present invention involving addition of small amounts of trace elements is also within the scope of the invention as long as the properties displayed by the catalysts of the invention are obtained. In this context, the term trace elements refers to additives which replace a small part of the interlayer cations and whose concentration is low relative to the amount of interlayer cations. Examples of such elements can be, inter alia, calcium, sodium or other elements known to those skilled in the art. With regard to the catalyst of the invention, it should be emphasized that the interlayer cations are not present only in the hexaaluminate-comprising phase but also in the crystalline oxidic secondary phase.

It has been discovered that the crystalline oxidic secondary phase preferably also comprises the elements of the interlayer cations from the group consisting of La, Ba and/or Sr. Particular elements in the secondary phases (for example nickel-comprising spinel) and particular secondary phases (for example γ-alumina) tend to be undesirable as secondary phases. However, it is also conceivable that there could also be, for example, other elements and phases which can be present in the secondary phase but not adversely affect the catalytic properties of the catalyst of the invention.

In a preferred embodiment, metal salts in the form of nitrate salts and/or aluminum source in the form of nanoparticulate aluminum oxide hydroxide are used in the process for producing the catalyst of the invention for reforming hydrocarbons and $CO_2$.

In the process of the invention, the mixture used for producing the catalyst is preferably produced in the presence of water as solvent.

The term nanoparticulate aluminum oxide hydroxide source as used for the purposes of the present disclosure is explained in more detail below:

A nanoparticulate aluminum hydroxide is preferably used as source of the aluminum component for producing the hexaaluminate-comprising catalysts of the invention. The nanoparticulate aluminum hydroxide is particularly reactive and therefore particularly advantageous as aluminum source since, compared to other aluminum sources, transformation of the starting components into the target phase hexaaluminate can be achieved even at relatively low temperatures. The higher reactivity can be ascribed to the presence of the reactive aluminum phase. For the purposes of the invention, aluminum oxides and hydroxides having a high proportion of water are preferred; bayerite, boehmite and pseudo boehmite are particularly preferred, with very particular preference being given to boehmite. Particular importance is likewise attached to the fineness of the material.

In particular, it is also important that the primary crystallites of the material are smaller than 500 nm, particularly preferably smaller than 300 nm, very particularly preferably smaller than 100 nm, in order to obtain a high reactivity. Such primary crystals can be joined to form larger aggregates; depending on the pretreatment of the material, such aggregates of crystallites of this type can also be deaggregated to a certain degree by means of suitable methods. Suitable deaggregation methods are, inter alia, treatment with acids and basis, milling of powders or other methods known to those skilled in the art. In particular cases, pre-aggregation of the materials can also be useful. Suitable methods can be, inter alia: compacting, tableting, kneading and other processes known to those skilled in the art.

Particular preference is given to using high-purity aluminas, in particular those which are marketed under the trade names Pural, Dispal, Puralox or Catalox from Sasol. Comparable products from other manufacturers are likewise encompassed by the production process of the invention.

Reforming Process

The invention also provides a process for reforming hydrocarbons, preferably methane, in the presence of $CO_2$.

The process for reforming hydrocarbons, preferably methane, the presence of $CO_2$ comprises the following steps:

(a.1) contacting of reforming gas comprising hydrocarbons, preferably methane, and $CO_2$ with a nickel hexaaluminate-comprising catalyst according to the disclosure of the invention, (a.2) heating of the catalyst on contacting with the reforming gas at a temperature of >800° C. and more preferably at a temperature of >850° C., (a.3) operation of the reactor at a process pressure of >5 bar, preferably at a process pressure of >10 bar and more preferably at a process pressure of >15 bar, while carrying out the reaction, (a.4) the reforming gas brought into contact with the catalyst has a GHSV in the range from 500 to 20 000 hr¹, preferably in the range from 1500 to 10 000 hr¹ and more preferably in the range from 2000 to 5000 hr¹.

Preference is given to the reforming gas mentioned in step (a.1) having an $H_2O$ content of up to 70% by volume, preferably up to 50% by volume, and particularly preferably up to 30% by volume.

Furthermore, in a preferred embodiment, the catalyst used in the reforming process is used in the reduced form or a reduction step precedes the reforming process.

In a further preferred embodiment of the process of the invention, use is made of a starting fluid which comprises water vapor and has a composition in which the components $CH_4/CO_2H_2O$ are present in a gas volume ratio of from 25/25/50 to 50/50/0, with preference being given to the range from 35/35/30 to 45/45/10.

A synthesis gas having an $H_2/CO$ ratio in the range from 0.8 to 2.0 is preferably produced by means of the reforming process of the invention, with the $H_2/CO$ ratio of the synthesis gas preferably being in the range from 0.9 to 1.1.

An important aspect of the catalyst of the invention relates to its extraordinary high long-term stability, which is such that the catalyst displays no great decreases in activity in the reforming process of the invention, i.e. the reforming of hydrocarbons, preferably methane, in the presence of $CO_2$, even though the process is carried out at high pressures and high temperatures.

The catalyst of the invention thus enables the operating times of plant operation in the reforming of hydrocarbons in the presence of $CO_2$ to be increased, which is of great technical relevance in the development of the process. In general, the catalysts can no longer be regenerated after use in a plant and then have to be disposed of. The lengthening of the operating time reduces the amount of material to be disposed of, which improves the economics of the process.

The production of significantly smaller amounts of catalyst waste products and a high-performance, efficient process for binding $CO_2$ have a substantial advantage over established processes and catalysts which are already known from the prior art.

It is also astonishing that, in particular, the range of low nickel contents of ≤3 mol %, preferably ≤2.5 mol % and more preferably ≤2 mol %, in combination with the further features of the invention has led to significantly improved catalysts for reforming. A particular aspect which should also be mentioned is that the pure-phase hexaaluminate materials do not correspond to the catalyst of the invention since the pure-phase materials do not have the catalytic performance properties of the catalysts of the invention.

The catalysts having the low nickel contents and the further features according to the invention display a high catalytic efficiency and at the same time an excellent long-term stability. The findings demonstrate that the metallic nickel, which plays a central role in catalytic reforming, can be present in structurally different form and distribution within the catalyst. The differentiation between the nickel particles having a tetragonal form and the rather ball-like particles is of importance here. Catalysts which in the structural examination show barely any ball-like particles but instead finely dispersed nickel particles having a tetragonal form have been developed. It can be assumed that a minimum content of these nickel species in the catalyst is necessary to achieve the desired effectiveness of the catalyst.

For example, the activity of a catalyst according to the invention having a nickel content of 0.1 mol % can be somewhat lower than the activity of a catalyst according to the invention having a nickel content of 1.5 mol % since the concentration of the structurally preferred nickel particles is low. It can therefore be assumed that a particular minimum quality of nickel in the catalyst of the invention is advantageous. In the context of the process of the invention, the nickel content should preferably be >0.1 mol %, more preferably >0.25 mol % and particularly preferably 0.5 mol %.

It would also be conceivable to use the catalyst of the invention for catalytic processes other than the process of the invention for reforming hydrocarbons and carbon dioxide. This means that the catalysts having the low nickel content and the further inventive features have a technical and economic use potential even outside the field of reforming in the presence of carbon dioxide. The invention is therefore not intended to be restricted only to the catalysts according to the invention having low nickel contents but also relates to catalysts having ultralow nickel contents, as long as the nickel particles have the preferred tetragonal form.

I. Illustrative Samples

Table 1 gives an overview of a series of 16 samples produced by way of example and also their composition and characterization data. The figures reported for the chemical composition are based on the molar proportions of Al, of Ni and also of at least one further element from the group consisting of La, Sr, Ba. In the sample numbering, the letters L, S or B were added to the respective samples depending on the element present therein. The samples L1 to L4 were calcined at a temperature of 1600° C. and all other samples (i.e. L5 to L8, S1 to S4 and B1 to B4) were calcined at temperature of 1200° C.

To explain the invention, the production of the experimental samples L1 and L5, which have a stoichiometric composition of $Al_{0.846}La_{0.077}Ni_{0.077}$ and an La: Ni ratio of 1 will be described below. 100 mL of distilled water were firstly placed in a glass beaker and 18.242 g of lanthanum nitrate hexahydrate ($La(NO_3)_3 \times 6\ H_2O$) and 12.884 g of nickel nitrate hexahydrate ($Ni(NO_3)_2 \times 6\ H_2O$) were subsequently added to the water. After the salts had dissolved whilst stirring, the solution was heated to a temperature of 45° C. and 30.606 g of Disperal (Condea or SASOL) were added as solid to the heated solution, leading to a suspension. The suspension was cooled to 25° C. while stirring and taken up by means of a pipette and introduced dropwise into a Dewar vessel with liquid nitrogen for molding. The liquid nitrogen in the Dewar was mixed vigorously by means of a magnetically driven stirrer bath during the dropwise introduction of the suspension. The frozen suspension particles were distributed as an about 1 cm thick powder layer over a plurality of stainless steel dishes of a freeze drying plant. The stainless steel dishes were introduced into the freeze drying plant and subjected to a drying process. In the drying process, the stainless steel dishes covered with the suspension particles were stored for a time of 48 or 96 hours at a pressure of 1.98 mbar, with the temperature in the interior of the drying plant being increased stepwise from −25° C. to −5° C. (As freeze drying product, use was made of the model Gamma 1-20 from the manufacturer Martin Christ.)

The sample material obtained after freeze drying was introduced into two porcelain dishes which were then calcined at different temperatures in a high-temperature furnace (from Carbolite). In the case of the production of sample L5, the sample was calcined at a temperature of 1200° C., and in the case of the production of sample L1, the sample was calcined at 1600° C. The calcination was selected so that the samples were each maintained for 1 hour at the temperatures 100° C., 250° C., 350° C. and 450° C. before reaching the target temperature. Up to a temperature of 450° C., the samples were heated at a heating rate of 1 K/min, and from 450° C. to the respective target temperature, the samples were heated at a heating rate of 5 K/min. During calcination, air was passed through the furnace. After calcination was complete, the samples were cooled to room temperature over a period of 5 hours, with air continuing to be passed through the furnace.

After calcination, the calcined samples were subjected in portions to a reductive treatment process. For this purpose, about 2.5 g of the samples were in each case introduced into a fused silica tube provided with a frit. The fused silica tube had an internal diameter of 1.32 cm and the bed height of the sample present on the frit was 1.5 cm. The sample present in the fused silica tube was heated under a hydrogen-comprising gas atmosphere (i.e. a forming gas comprising 5% of $H_2$ in $N_2$) to 900° C. and subsequently maintained at 900° C. for 3 hours. The samples were subsequently cooled to 100° C. while passing a forming gas through them. A flow rate of the gas stream of 10 mL per minute was maintained both during the heating process and during the cooling process. After the samples had cooled to 100° C., CDA was added stepwise to the gas stream in order to passivate the samples in the reduced state.

Table 1 shows a summary overview of the 16 samples produced by way of example, their composition and the results of the BET analyses. For the composition, the elemental composition in respect of the molar proportions of Al, of Ni and of at least one further element from the group consisting of La, Sr, Ba is reported. In addition, the proportion of hexaaluminate present in the individual samples is also reported. Quantification on the hexaaluminate content was carried out by means of a Rietveld analysis of the respective diffraction patterns. Samples in the unreduced form were used both for the BET analysis and for the X-ray diffraction study.

view onto a platelet-like particle which has the characteristic shape of a hexaaluminate phase. Numerous smaller nickel particles having a size in the region of 20 nm have grown onto the surface of the hexaaluminate particle.

The size determination of the grown-on metallic particles was carried out on the basis of transmission electron micrographs, with the size of the nanoparticles grown onto the hexaaluminate being determined. It was not possible to carry out the measurements by means of an automated method. The reason was the low contrast and the defects on the surface of the hexaaluminate particle, which would have interfered considerably in the use of automated recognition methods.

It is notable that many of the small nickel particles having a size of from 10 to 30 nm have a defined texture, with the predominant proportion of the particles having angular structural features and some of the particles clearly displaying a tetrahedral shape. The base area of these tetrahedral nickel particles is grown onto the surface of the hexaaluminate platelet. It appears obvious from this defined structural configuration that the crystallites are morphologically the same and have identical or similar growth orientations.

| Sample number | Additive element and nickel | La [mol %] | Ni [mol %] | Al [mol %] | Proportion of hexaaluminate | BET [m²/g] | Ratio Al/(La + Ni) |
|---|---|---|---|---|---|---|---|
| L1 | LaNi1 | 7.69 | 7.69 | 84.62 | 98 | <0.1 | 5.50 |
| L2 | LaNi0.75 | 7.69 | 5.77 | 86.54 | 98 | <0.1 | 6.43 |
| L3 | LaNi0.5 | 7.69 | 3.85 | 88.46 | 96 | <0.1 | 7.67 |
| L4 | LaNi0.25 | 7.69 | 1.92 | 90.39 | 90 | <0.1 | 9.41 |
| L5 | LaNi1 | 7.69 | 7.69 | 84.62 | 81 | 8.5 | 5.50 |
| L7 | LaNi0.5 | 7.69 | 3.85 | 88.46 | 90 | 10.8 | 7.67 |
| L8 | LaNi0.25 | 7.69 | 1.92 | 90.39 | 84 | 14.6 | 9.41 |

| Sample number | Additive element and nickel | Sr [mol %] | Ni [mol %] | Al [mol %] | Proportion of hexaaluminate | BET [m²/g] | Ratio Al/(Sr + Ni) |
|---|---|---|---|---|---|---|---|
| S1 | SrNi1 | 7.69 | 7.69 | 84.62 | 80 | 24.6 | 5.50 |
| S2 | SrNi0.75 | 7.69 | 5.77 | 86.54 | 81 | 29.3 | 6.43 |
| S3 | SrNi0.5 | 7.69 | 3.85 | 88.46 | 83 | 22.3 | 7.67 |
| S4 | SrNi0.25 | 7.69 | 1.92 | 90.39 | 83 | 26 | 9.41 |

| Sample number | Additive element and nickel | Ba [mol %] | Ni [mol %] | Al [mol %] | Proportion of hexaaluminate | BET [m²/g] | Ratio Al/(Ba + Ni) |
|---|---|---|---|---|---|---|---|
| B1 | BaNi1 | 7.69 | 7.69 | 84.62 | 87 | 24.6 | 5.50 |
| B2 | BaNi0.75 | 7.69 | 5.77 | 86.54 | 93 | 29 | 6.43 |
| B3 | Bani0.5 | 7.69 | 3.85 | 88.46 | 88 | 20.9 | 7.67 |
| B4 | BaNi0.25 | 7.69 | 1.92 | 90.39 | 73 | 13.8 | 9.41 |

II. Sample Characterization by Means of TEM

The samples S4, B3 and B2 were, in reduced form, characterized more closely by means of transmission electron microscopy. The TEM characterization was carried out on the samples after they had been subjected to the reductive treatment process. The results of this characterization are shown in FIGS. 1 to 3 and are discussed below.

The transmission electron micrographs show light-colored structures which can unambiguously be assigned to the nickel particles which are present in metallic form. It may be pointed out that the X-ray diffraction patterns of the samples also indicate the presence of metallic nickel particles, but the low particle size and the low nickel content do not permit unambiguous confirmation by means of the X-ray data.

The invention is illustrated by the sample S4 (with $SrNi_{0.25}$), whose transmission electron micrograph is depicted in FIG. 1. The micrograph in FIG. 1 shows a plan For the purposes of the invention, the size of the nanoparticles is of great importance. A cumulative assessment distribution of the particle size or of the equivalent diameter is employed in order to define the size range. Based on the cumulative assessment of the particle size of the material according to the invention, preference is given to 30% of the particle population having a particle size below the threshold value according to the invention, particular preference is given to 50% of the particle population having a particle size below the threshold value according to the invention, and very particular preference is given to 70% of the particle population having a particle size below the threshold value according to the invention.

The number of relatively large nickel particles having a size of about 100 nm and above increases with increasing nickel content. This is shown by way of example by the micrographs of the samples B3 and B2 in FIGS. 2 and 3, where the sample B3 has a nickel content of 3.85 mol % and the sample B2 has a nickel content of 5.77 mol %. The relatively large nickel particles are located very close to adjacent nickel particles.

In the metallic form of nickel, the individual nickel atoms have a face centered cubic arrangement. In this crystalline system, the lattice vector [uvw]=[111] is the three-dimensional diagonal of the cube and intersects the middle of the face of both octahedra and tetrahedra. In the cubic system ($a=b=c$, $\alpha=\beta=\gamma$), this vector is perpendicular to the face having the index (hkl)=(111). $[111]^{\perp}(111)$. Vectors [111], [−111], [−1-11] and [1-11] are symmetry-equivalent. It can therefore be concluded from these crystallographic considerations that it is the (111) face of the nickel nanoparticles which preferentially grows onto the hexaaluminate particles. It can be assumed that this type of bonding leads to particularly good contact of the metallic nickel particle with the oxidic surface. This could, without restricting the invention in any way by theoretical considerations, be an explanation for the finding that the illustrative samples are extremely resistant to sintering processes in catalysis experiments, which is directly associated with the extremely good performance properties of the catalysts when they are used industrially.

Figure 1:
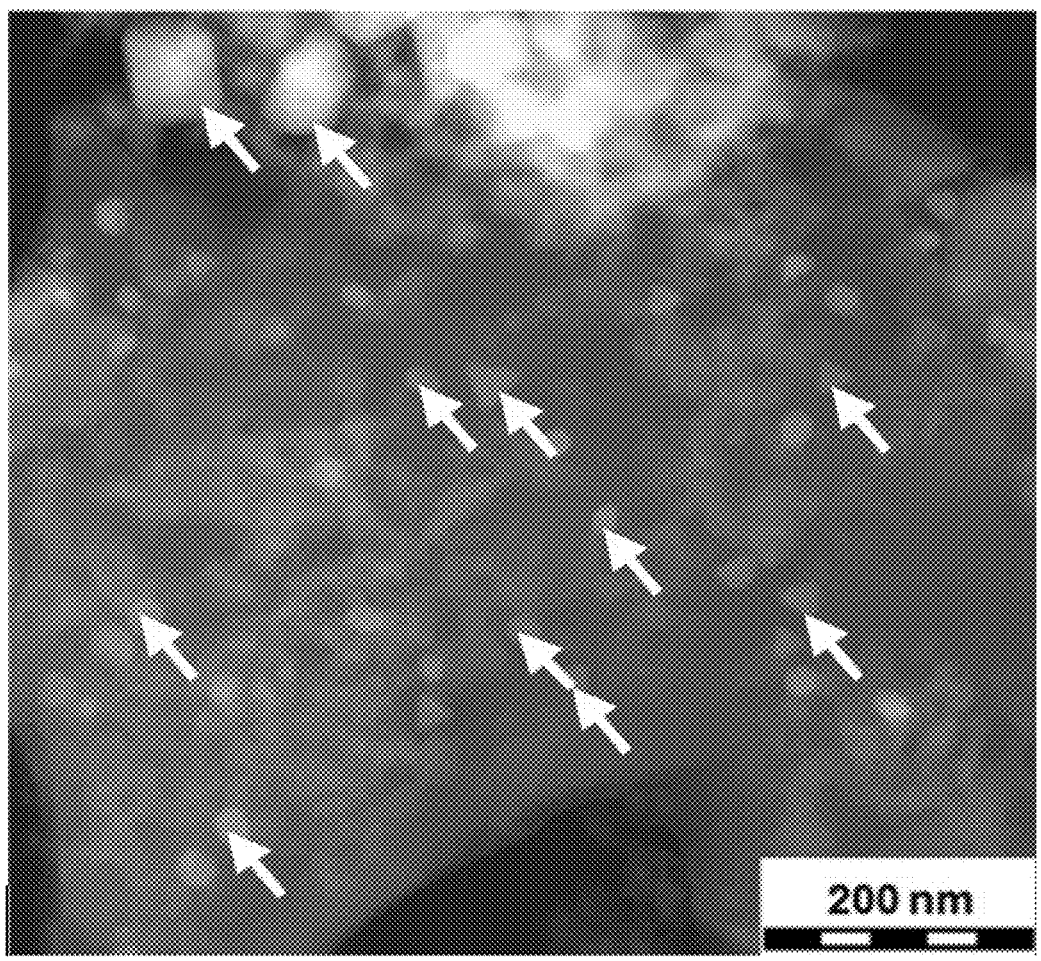
FIG. 1 shows a micrograph of the sample S4 according to the invention (with $SrNi_{0.25}$) taken by means of a TEM (transmission electron microscope) at an enlargement of 1:200 000. In the middle region, the surface of a hexaaluminate platelet on which numerous smaller nickel particles having a size of about 20 nm have grown on have been deposited on can be seen. At top left of the micrograph, there are two nickel particles having a size of about 100 nm.
Figure 2:
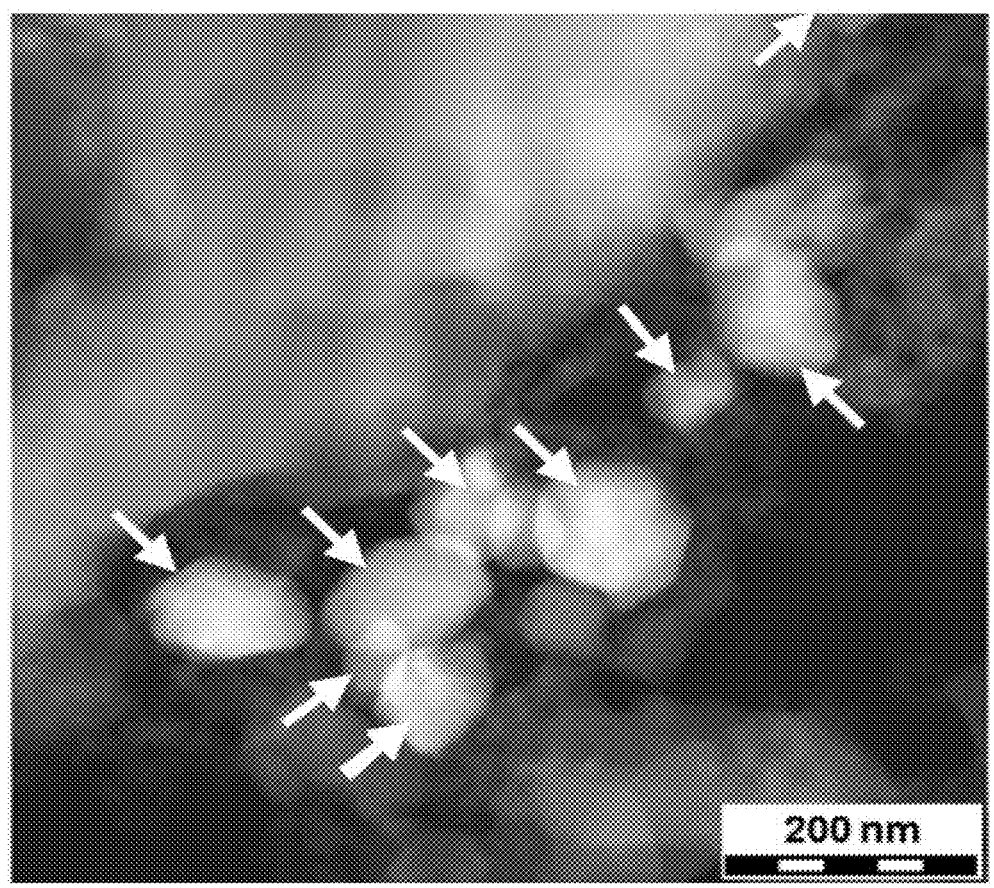
FIG. 2 shows a transmission electron micrograph of the sample B3 (with $BaNi_{0.5}$) at an enlargement of 1:200 000. In the center, a plurality of particles having a diameter of 100 nm and above (see arrow) can be seen.
Figure 3:
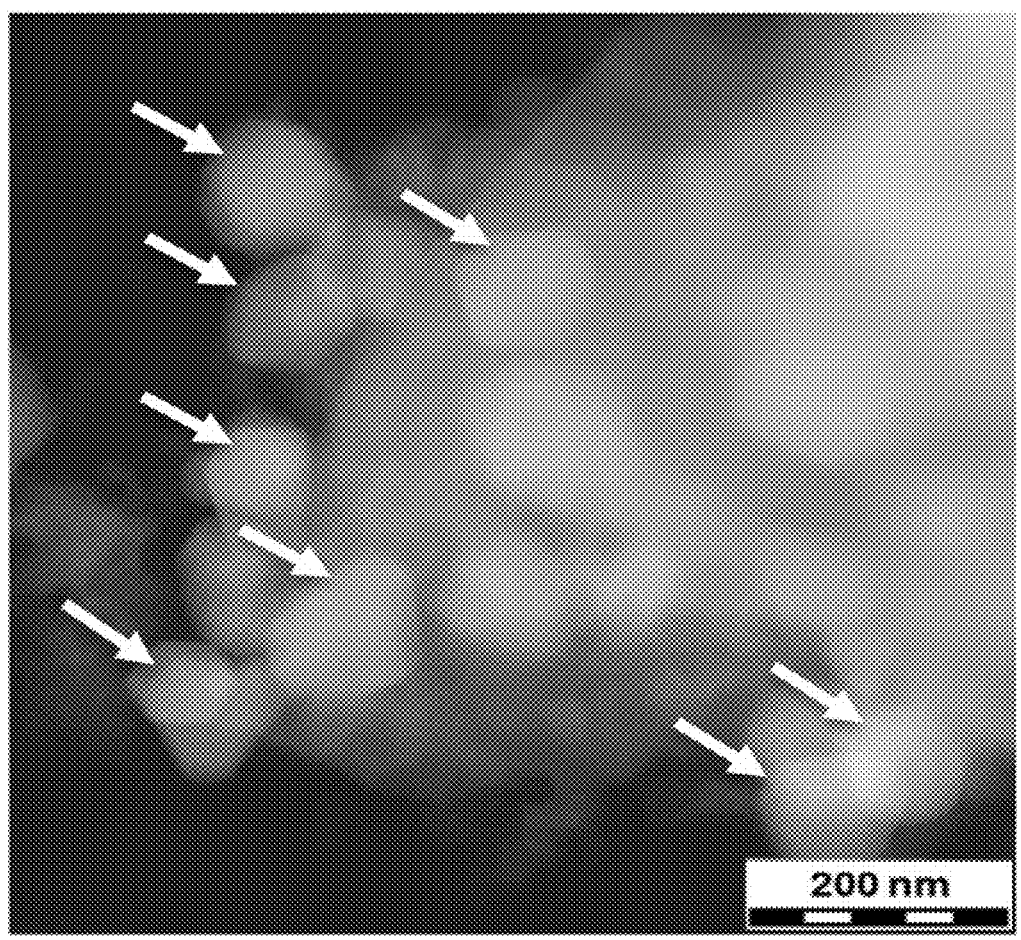
FIG. 3 shows a transmission electron micrograph of the sample B2 (with $BaNi_{0.75}$) at an enlargement of 1:200 000. A plurality of nickel particles having a size of 100 nm and above can be seen. The spatial distances between the adjacent nickel particles appear to be small.
Figure 4:
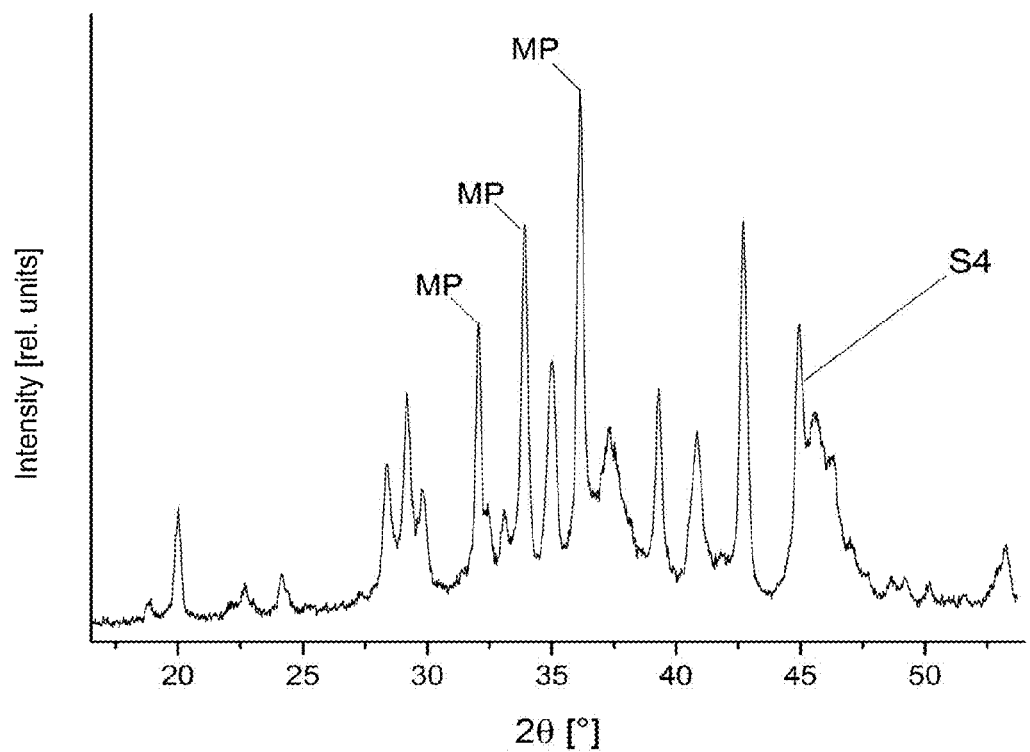
FIG. 4 shows an X-ray diffraction pattern of the sample S4 (with $SrNi_{0.25}$), which was recorded on the sample in the unreduced state.
Figure 5:
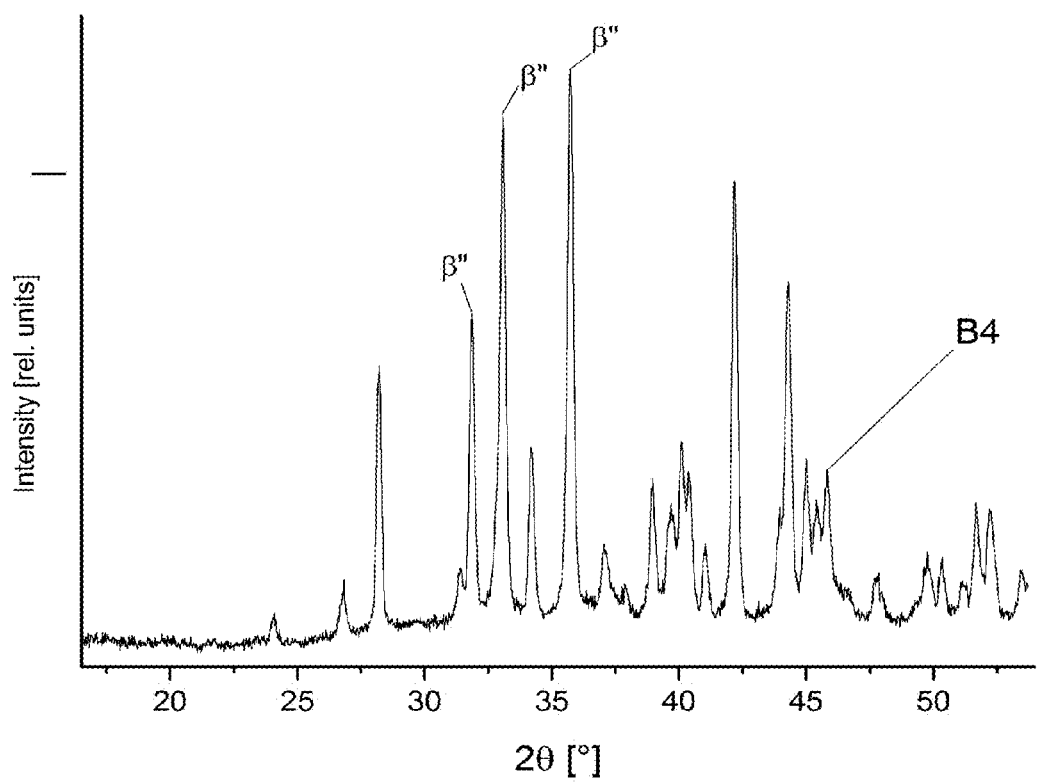
FIG. 5 shows an X-ray diffraction pattern of the sample B4 (with $BaNi_{0.25}$), which was recorded on the sample in the unreduced state. The reflections at 31.86, 33.08 and 35.72 $2\theta[°]$ demonstrate the presence of β''-aluminate phase.
Figure 6:
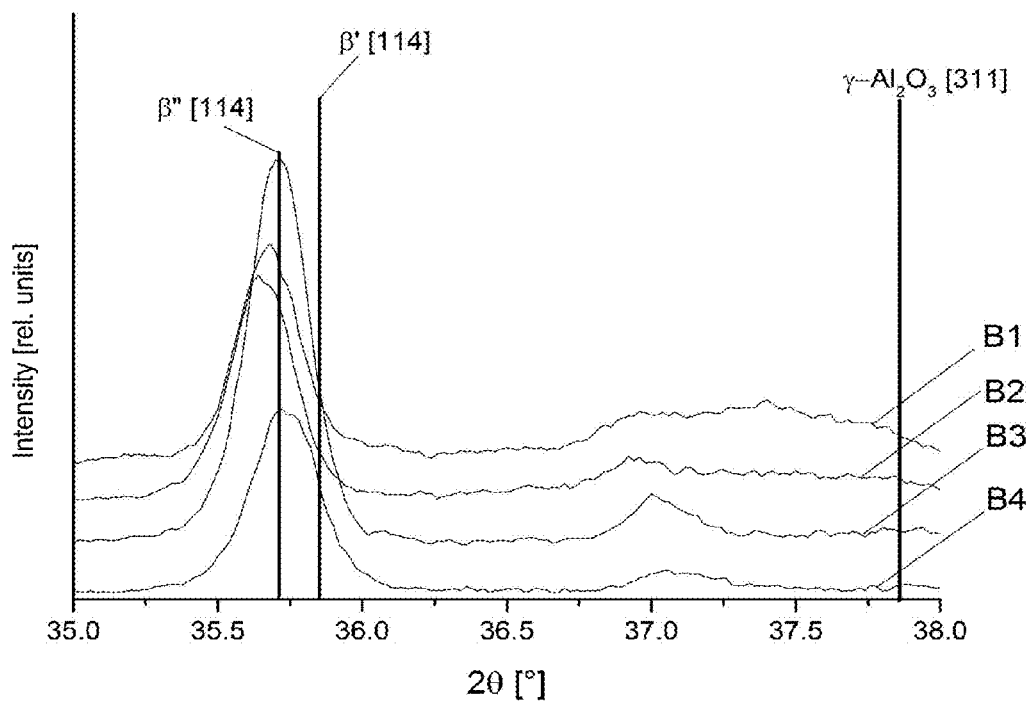
FIG. 6 shows an X-ray diffraction patterns of the samples B1, B2, B3 and B4 in the angle range 35.0-38.0 $2\theta[°]$, which were recorded on the samples in the unreduced state. The reflections at 35.72 $2\theta[°]$ demonstrate the presence of β'-aluminate phase. A reflection at 35.85 $2\theta[°]$, characteristic of β-aluminate phase, is not to be found in the XRD pattern.

Study of the samples after reduction: examination of nickel nanoparticles which have not grown onto hexaaluminate platelets The micrographs illustrate that the number of such particles increases with an increasing proportion of nickel in the oxidic hexaaluminate and the larger nickel particles do not grow exclusively in strongly textured form on the hexaaluminate platelets. In particular, such large nickel particles occur above a nickel content of $Ni_{0.25}$ or 1.92 mol %.

II. Catalyst Studies

For the catalytic characterization, the active compositions were tested in a circulation reactor. The samples to be examined were diluted with silicon carbide, with in each case 20 mg of a sample being mixed with in each case 80 mg of silicon carbide. The studies were carried out using samples whose particle size was in the range from 500 to 750 μm. The silicon carbide used in the studies had the same particle size fraction as the catalyst samples to be tested, i.e. a particle size in the range from 500 to 750 μm. The respective test mixture of catalyst sample and silicon carbide was introduced into a reactor tube having an internal diameter of 6 mm. The reactor tube, which consisted of an aluminum oxide ceramic having a wall thickness of 1 mm, was installed in a steel reactor having an internal diameter of 8 mm. The dimensions of the reactor tube and of the steel reactor were matched so that no gas could travel between ceramic and steel reactor wall.

Nitrogen gas was firstly passed through the reactor filled with sample, which was heated to 800° C. at atmospheric pressure. The sample was subsequently subjected at 800° C. and under atmospheric pressure to a reductive pretreatment step which comprised exposing the sample to a gas atmosphere comprising 20% of hydrogen and 80% of nitrogen for 2 hours.

As catalytic test reaction, the production of synthesis gas form methane and carbon dioxide was examined. The test reactions were carried out at 10 bar and 850° C., using a feed gas having a methane to carbon dioxide ratio of 1. 10% by volume of nitrogen, which functioned as internal standard, were introduced into the feed gas. To achieve recycle operation, the product gas was fed by means of a gas pump back into the feed gas line to the reactor, with the gas flow being selected so that the absolute gas flow was 100 mL/min (i.e. the GHSV was about 60 000 $h^{-1}$). The composition of the product gas leaving the reactor was analyzed by means of a GC system.

The results of the catalytic reforming studies are shown in table 2 and table 3.

It may be pointed out that firstly the activity and secondly the selectivity are employed for evaluating the catalytic properties of the catalyst. As regards the target reaction, in the illustrative studies the dry reforming of methane in the presence of carbon dioxide, the activity of the catalyst is firstly of importance.

In table 2, the activity of the catalyst relative to the other samples can be concluded by comparison of the conversions of methane and carbon dioxide. However, the selectivity of the catalysts, which in the present case is expressed in relative terms via the hydrogen to carbon monoxide ratio, is also important. In general, a ratio of hydrogen to carbon monoxide of about 1 is desirable here. Lower ratios of hydrogen to carbon monoxide point to further reaction of these products over the catalyst.

Table 2 shows a summary of the test results for the samples with the chemical compositions, the calcination temperature and the catalytic properties which were in each case achieved after 10 hours at 850° C., 10 barg and an initial composition of the feed gas of $CH_4/CO_2=1$. As test results, the conversions of methane, the conversions of $CO_2$ and the $H_2/CO$ ratios are reported.

| Sample number | Additive element and nickel | Conversion of $CH_4$ (10 h) [%] | Conversion of $CO_2$ (10 h) [%] | $H_2/CO$ after 10 h |
|---|---|---|---|---|
| L1 | LaNi1 | 31 | 34 | 0.634 |
| L2 | LaNi0.75 | 23 | 23 | 0.670 |
| L3 | LaNi0.5 | 20 | 22 | 0.500 |
| L4 | LaNi0.25 | 89 | 72 | 0.986 |

-continued

| Sample number | Additive element and nickel | Conversion of $CH_4$ (10 h) [%] | Conversion of $CO_2$ (10 h) [%] | $H_2/CO$ after 10 h |
|---|---|---|---|---|
| L5 | LaNi1 | 42 | 39 | 0.475 |
| L7 | LaNi0.5 | 44 | 31 | 0.742 |
| L8 | LaNi0.25 | 52 | 46 | 0.522 |
| S1 | SrNi1 | 91 | 71 | 0.784 |
| S2 | SrNi0.75 | 99 | 64 | 0.634 |
| S3 | SrNi0.5 | 83 | 64 | 0.670 |
| S4 | SrNi0.25 | 82 | 72 | 0.897 |
| B1 | BaNi1 | 91 | 75 | 0.784 |
| B2 | BaNi0.75 | 98 | 67 | 0.634 |
| B3 | Bani0.5 | 90 | 68 | 0.670 |
| B4 | BaNi0.25 | 82 | 77 | 0.814 |

The activity of the catalyst relative to the other samples can be taken from table 3 by comparison of the maximum CO concentration achieved and the time after which this value is achieved. However, the selectivity of the catalyst, which is in this case expressed by comparison of the carbon monoxide concentration at the end of the experiment, is also important. In general, a very small difference between the maximum concentration achieved and the concentration at the end of the experiments is desirable. Low concentrations of carbon monoxide at the end of the experiment relative to the maximum value can point to further reaction of the carbon monoxide over the catalyst. In general, it is desirable to achieve the maximum concentration within a very short time, but this aspect is subordinate to the aspect of maintenance of the maximum concentration of carbon monoxide. A large decrease in the maximum carbon monoxide concentration automatically indicates the formation of carbon-comprising deposits on the catalyst, which are undesirable since they greatly shorten the life of the material.

Table 3 shows a summary presentation of the catalytic test results in respect of the CO contents in the reaction gas obtained for the various samples, with both the maximum of the CO content determined during the experiments and the CO content after a test time of 10 hours (at 850° C., 10 barg and an initial composition of the gas of $CH_4/CO_2=1$) being determined here.

| Sample number | Additive element and nickel | Maximum CO concentration achieved [% by volume] | CO concentration at the end of the experiment [% by volume] | Time required to achieve the maximum CO concentration [min] | Total time [min] |
|---|---|---|---|---|---|
| L1 | LaNi1 | 22.71 | 22.71 | 583 | 583 |
| L2 | LaNi0.75 | 11.36 | 11.36 | 582 | 582 |
| L3 | LaNi0.5 | 13.17 | 13.17 | 585 | 585 |
| L4 | LaNi0.25 | 38.52 | 25.38 | 162 | 582 |
| L5 | LaNi1 | 19.48 | 19.42 | 502 | 582 |
| L7 | LaNi0.5 | 13.70 | 13.70 | 583 | 583 |
| L8 | LaNi0.25 | 22.55 | 20.38 | 291 | 591 |
| S1 | SrNi1 | 35.73 | 28.21 | 82 | 582 |
| S2 | SrNi0.75 | 31.95 | 26.02 | 102 | 582 |
| S3 | SrNi0.5 | 32.98 | 27.46 | 162 | 582 |
| S4 | SrNi0.25 | 31.96 | 30.87 | 251 | 591 |
| B1 | BaNi1 | 44.76 | 31.37 | 131 | 591 |
| B2 | BaNi0.75 | 55.91 | 26.61 | 62 | 582 |
| B3 | Bani0.5 | 51.36 | 30.52 | 167 | 587 |
| B4 | BaNi0.25 | 38.17 | 36.74 | 271 | 591 |

Brief Description of the Characterization Methods:

Physical characterization of all catalyst samples examined in the examples was carried out by means of XRD analyses, nitrogen sorption measurements and bulk density measurements. The XRD analyses were carried out using a D8 Advance Serie 2 from Bruker/AXS using a CuK-alpha source (having a wavelength of 0.154 nm at 40 kV and 40 mA). The measurements were carried out over the measurement range: 5-80° (2Theta), 0.02° steps at 4.8 seconds/step. The Rietveld analyses are based on evaluation of the reflection intensities. The BET data and the Rietveld analysis data shown in table 1 relate to the samples in the unreduced state.

The invention claimed is:

1. A catalyst for reforming hydrocarbons and $CO_2$ which comprises oxidic support material comprising:
   hexaaluminate in the form of β"-aluminate and/or magnetoplumbite; and
   metallic nickel particles, wherein the metallic nickel particles have angular structural features, are finely distributed over the surface of the oxidic support material as grown-on particles and the average particle size of the nickel particles is <50 nm.

2. The catalyst for reforming hydrocarbons and $CO_2$ according to claim 1, wherein 50% of the nickel particle population has a particle size below 50 nm.

3. The catalyst for reforming hydrocarbons and $CO_2$ according to claim 1, wherein the number of spherical particles per $\mu m^2$ of surface section of the hexaaluminate particle is ≤10.

4. The catalyst for reforming hydrocarbons and $CO_2$ according to claim 1, wherein the nickel content of the catalyst is ≤3 mol % and more than 50% of the nickel particles are present on the surface of the hexaaluminate.

5. The catalyst for reforming hydrocarbons and $CO_2$ according to claim 1, wherein the oxidic of the catalyst comprises at least 65-95% by weight of hexaaluminate and 5-35% by weight of crystalline oxidic secondary phase, the hexaaluminate comprises at least one interlayer cation from the group consisting of Ba, Sr and La with a molar interlayer cation to aluminum ratio in the range 1:6-11, the crystalline oxidic secondary phase comprises at least $LaAlO_3$, $SrAl_2O_4$ and/or $BaAl_2O_4$ and the BET surface area of the catalyst is >5 $m^2/g$.

6. The catalyst for reforming hydrocarbons and $CO_2$ according to claim 1, wherein the x-ray diffraction pattern of the catalyst displays an amount of β-aluminum oxide of less than 10% by weight.

7. A process for producing a catalyst for reforming hydrocarbons and $CO_2$ according to claim 1, wherein the catalyst comprises at least 65-95% by weight of nickel hexaaluminate as main phase and 5-35% by weight of crystalline oxidic as secondary phase, the comprises the following steps:
  (i) contacting of a nanoparticulate alumina oxide hydroxide source, where the primary crystallites of the material are smaller than 500 nm, with metal salt comprising an element from the group consisting of La, Sr and Ba and also a nickel salt, where the nickel content is <3 mol % and the molar ratio of interlayer cation to aluminum is in the range 1:6-11,
  (ii) intimately mixing the starting components together to form a mixture,
  (iii) drying, decomposing the salts and/or molding the mixture, and
  (iv) calcining the mixture at a temperature of >900° C., followed by a reduction treatment of the catalyst.

8. A process for reforming hydrocarbons in the presence of $CO_2$, which comprises:
  (a.1) contacting reforming gas comprising hydrocarbons and $CO_2$ with a nickel hexaaluminate comprising catalyst according to claim 1,
  (a.2) heating the catalyst on contacting with the reforming gas at a temperature of >800° C.,
  (a.3) operating the reactor at a process pressure of >5 bar, while carrying out the reaction,
  wherein the reforming gas brought into contact with the catalyst has a GHSV in the range from 500 to 20,000 $hr^{-1}$.

9. The process for reforming hydrocarbons in the presence of $CO_2$ according to claim 8, wherein the reforming gas in step (a.1) has an $H_2O$ content of up to 70% by volume.

10. The process for reforming hydrocarbons in the presence of $CO_2$ according to claim 8, wherein the catalyst is used in the reduced form, or wherein a reduction step precedes the catalytic process.

11. The process for reforming hydrocarbons in the presence of $CO_2$ according to claim 8, wherein a starting fluid comprises water vapor and has a composition in which the components $CH_4/CO_2/H_2O$ are present in a gas volume ratio ranging from 25/25/50 to 50/50/0.

12. The process for reforming hydrocarbons in the presence of $CO_2$ according to claim 8, wherein the catalyst is produced by a process comprising the following steps:
  (i) contacting of a nanoparticulate alumina oxide hydroxide source, where the primary crystallites of the material are smaller than 500 nm, with metal salt comprising an element from the group consisting of La, Sr and Ba and also a nickel salt, where the nickel content is <3 mol % and the molar ratio of interlayer cation to aluminum is in the range 1:6-11,
  (ii) intimately mixing the starting components together to form a mixture,
  (iii) drying, decomposing the salts and/or molding the mixture, and
  (iv) calcining the mixture at a temperature of >900° C., followed by a reduction treatment of the catalyst.

* * * * *